May 17, 1960 W. H. NEELY 2,936,825
WIRE SPRING AND SPRING SEAT CONSTRUCTION
Filed May 23, 1958 2 Sheets-Sheet 1
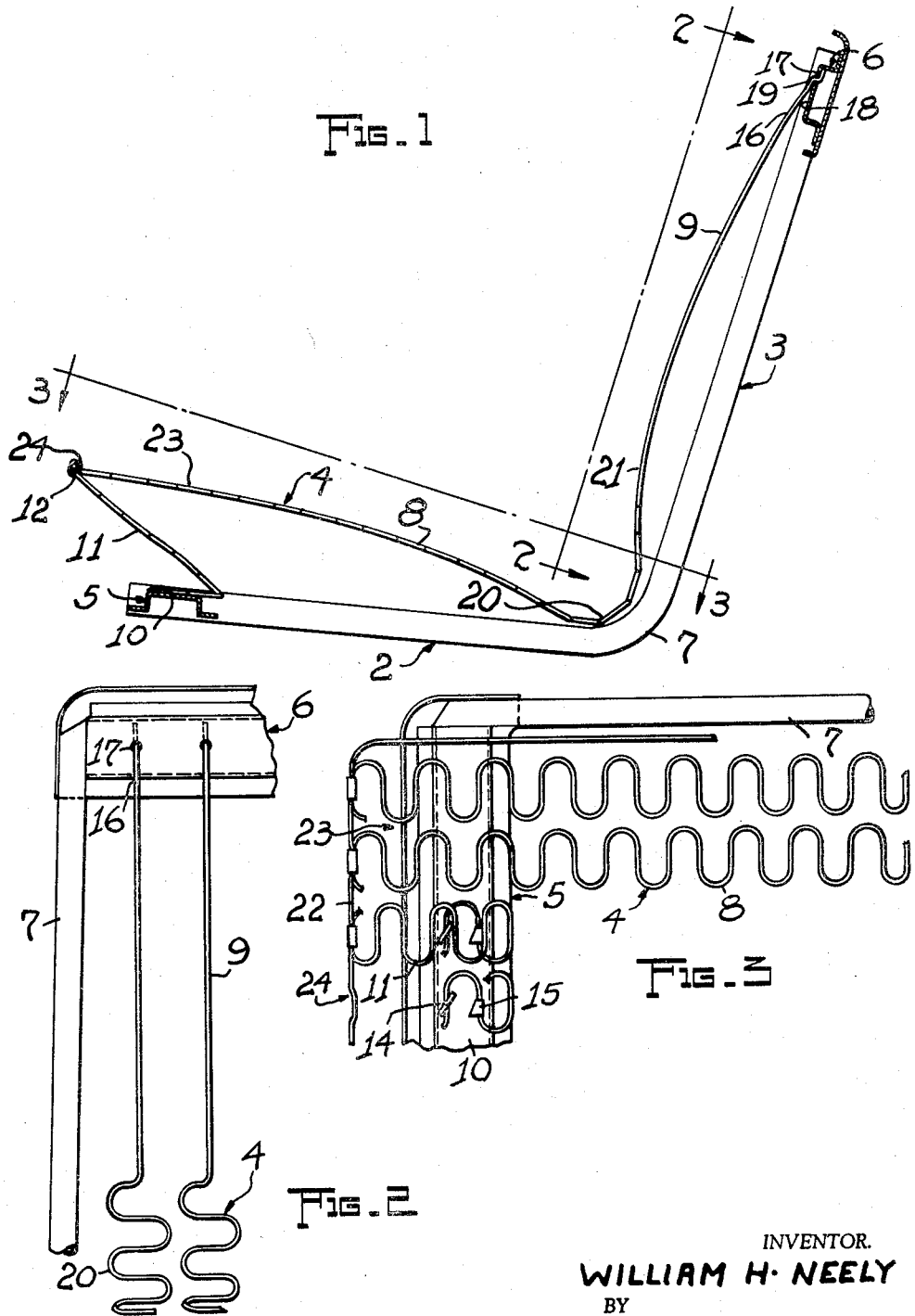
INVENTOR.
WILLIAM H. NEELY
BY
ATT.

May 17, 1960  W. H. NEELY  2,936,825
WIRE SPRING AND SPRING SEAT CONSTRUCTION
Filed May 23, 1958  2 Sheets-Sheet 2
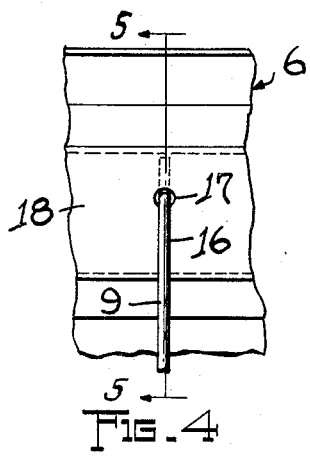
Fig. 4
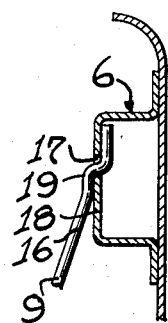
Fig. 5
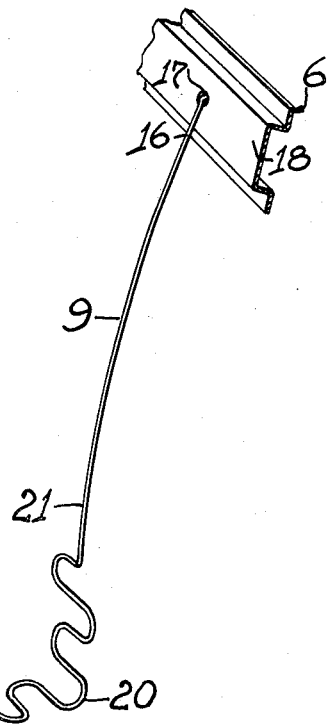
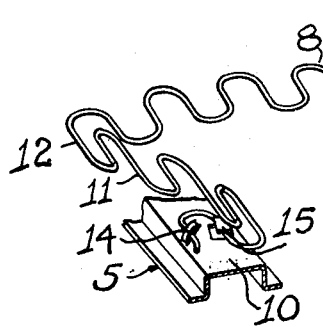
Fig. 6
INVENTOR.
WILLIAM H. NEELY
BY
ATT

United States Patent Office 2,936,825
Patented May 17, 1960

2,936,825
WIRE SPRING AND SPRING SEAT CONSTRUCTION

William H. Neely, Cleveland, Ohio, assignor to Universal Incorporated, Bedford, Ohio, a corporation of Ohio Application May 23, 1958, Serial No. 737,362

5 Claims. (Cl. 155—179)

This invention relates in general to sinuously corrugated wire spring elements and, more particularly, to improved sinuously corrugated wire spring elements for upholstered wire spring seating constructions.

Styling appearance has now become a factor of ruling importance in the automotive industry. As automobiles have been restyled lower and lower, and as engineers have developed more mechanical variations affecting frame and body shape, the seating problem has become increasingly difficult. As the roofs of cars are lowered, as the transmissions are moved adjacent the rear axles, and as the new air chassis suspensions and other mechanical innovations are adopted by the automotive industry for advanced performance purposes, less space is available for seating the passengers with adequate comfort through the mere use of prior known seat structures, such as zigzag spring units of the type typically disclosed in my Patent No. 2,280,480.

The lowering of car roofs by automotive stylists, and the increasing use by vehicle engineers of sharply angled ramps, large tunnels, and other irregular configurations extending upwardly into the floor pans to accommodate novel transmissions, suspensions and the like, has resulted in extreme reduction in the available inside space for static seating with little or no "extra" space for absorbing shock loading.

In order to achieve comfortable static seating within an automobile there should be sufficient inside space available to permit the spring surfaces and the supporting padding and upholstery to deflect for load support. There must be a minimum necessary spring deflection space for adequate total cushion and back penetration, under seating load pressures low enough to maintain reasonable body comfort, and at the same time there must also be still further free deflection space available to absorb shock load penetrations. It should be recognized, therefore, that any new concept in automobile seating must provide adequate seating comfort under both static and shock load conditions with relatively thin cushion and back structures; must provide rear seat foot room despite floor pan conformation and obstructions; and must achieve full shock load absorption and continuous dampening within a minimum available space.

It is the primary purpose of this invention, therefore, to provide novel wire spring elements of the type having integrally unitary seat and back rest portions embodying sinuously corrugated portions, and particularly constructed so as to provide flexible seat and back rest foundations adapted to fulfill the demands of upholstered seating constructions for modern automobile styling, wherein the wire spring elements are mounted on vertically and laterally spaced rails of frame means by suspending the back rest portion thereof from an upper rail and mounting the front end of the seat portion thereof in forwardly overhanging, elevated position on a lower rail to increase the load supporting contact of the seat and back rest portions, to effect a wide distribution of loading forces, and to decrease the normal load and shock load deflections of the seat and back rest portions.

The general object of the invention is the provision of a preformed wire spring element embodying a yielding, elongated, longitudinally extensible seat portion formed of zigzag-shaped wire and a yielding, elongated, longitudinally non-extensible back rest portion formed of straight wire, the seat and back rest portions being integrally connected with each other by a curved sweep, and the wire spring element including rearwardly and downwardly extended supporting means at the front end of the seat portion permitting yielding mounting of the wire spring element in forwardly elevated position on a support, and attaching means near the top of the back rest portion permitting suspension of the wire spring element from another support arranged in vertically and laterally offset relation with respect to the first support.

Wire spring elements supported in the aforesaid novel manner of the present invention attain both fore-and-aft and vertical stability by the forwardly overhanging, elevated mounting of their seat portions and by the suspension of their longitudinally non-extensible back rest portions. Furthermore, proper seating is achieved under substantially all load conditions because of the direct cooperation of the seat and back rest portions in response to force loads upon either or both, a cooperation which is "controlled" by the particular shapes of the seat and back rest portions respectively, and by the particularly coordinated shape of the connecting area therebetween.

Another object of the invention, therefore, is the provision of a preformed wire spring element of partly zigzag-shaped and partly straight wire including a zigzag-shaped, longitudinally extensible, flexible seat portion having a rearwardly and upwardly curved zigzag-shaped, curved sweep at the rear end thereof; a straight wire longitudinally non-extensible, flexible back rest portion extended upwardly from the curved sweep of the seat portion; a rearwardly and downwardly extending supporting means extended from the front end of the seat portion and permitting yielding, flexible mounting of the wire spring element at the front end of its seat portion in forwardly overhanging, elevated position on a relatively fixed support for fore-and-aft stability; and attaching means near the top of the longitudinally non-extensible straight wire back rest portion permitting suspension of the wire spring element from a relatively fixed support for vertical stability.

A wire spring element of the novel type described supported in the aforesaid manner, effects a hugging support of an occupant's back under both normal and shock loads and, particularly, effects increased hugging engagement and support of the lower part or "small" of an occupant's back by means of a pronounced forward "bow" which is preformed in the lower part of the back rest portion and is extended opposite the corresponding inward curvature or "hollow" of an occupant's back. This hugging support is readily controlled by predetermined rearward offsetting of the curved sweep of the wire spring element so as to avoid excessive hugging of the wire sweep under normal load and to increase such hugging under shock load.

A further object of the invention, therefore, is the provision of a preformed wire spring element having a zigzag-shaped portion and a straight wire portion, of the type described, and defining continuously unitary seat, back rest, and interconnecting curved sweep portions, wherein the back rest portion includes in the lower part thereof a pronounced forwardly extended bowed area arranged to extend substantially opposite the hollow of an occupant's back, and wherein the curved sweep is rearwardly offset so as to decrease at normal loads and increase at shock loads the forward hugging action thereof to effect under all load conditions proper full contacting support of an occupant's load shape.

Still another object of the invention is the provision of a preformed wire spring element which is of substantially L-shaped form including a horizontally arranged, longitudinally extensible, and upwardly curved seat portion of zigzag-shaped wire form; a vertically arranged, forwardly curved, longitudinally non-extensible back rest portion of straight wire form; a rearwardly curved connecting area between the longitudinally extensible seat portion and the longitudinally non-extensible straight wire back rest portion, extending in rearwardly offset relation with respect to the longitudinally non-extensible back rest portion and merging on a "sweeping" line of curvature into the seat and back rest portions; and supporting and suspension means at the front end of the seat portion and at the top end of the back rest portion.

Still another object of the invention is the provision of a plurality of preformed wire spring elements of partly zigzag-shaped, partly straight wire, mounted side-by-side on frame means to provide a seat construction, wherein each spring element is of substantially L-shaped form having a substantially horizontally arranged, longitudinally extensible, upwardly curved seat portion, including at its front end downwardly and rearwardly inclined supporting means and including at its rear end a rearwardly and upwardly extended curved sweep; and having a substantially vertically arranged, forwardly curved, longitudinally non-extensible straight wire back rest portion having attachment means at the top end thereof, and having a forwardly extended bow near the lower end thereof arranged to be positioned opposite the hollow of the back of an occupant of the seating construction, the bow being forwardly extended with respect to the curved sweep of the seat portion and merged thereinto.

With the above and other objects in view, the invention has certain other marked superiorities which clearly distinguish it from presently known structures and arrangements of this type. These improvements or characteristics embodying certain novel features of construction and design are clearly set forth in the appended claims and the embodiment of the invention hereinafter shown with reference to the accompanying drawings forming part of the specification.

In the drawings:

Figure 1 is a vertical cross sectional view through a wire spring seating construction assembled from a plurality of wire spring elements arranged side-by-side and each embodying the novel principles and features of the invention.

Figure 2 is a fragmentary front view of the wire spring construction shown in Figure 1, taken along the line 2—2 of Figure 1.

Figure 3 is a fragmentary top view of the wire spring seating construction shown in Figure 1, taken along the line 3—3 of Figure 1.

Figure 4 is an enlarged fragmentary front view showing the attachment of the back rest portion of a spring element to an upper fixed supporting rail.

Figure 5 is a vertical cross sectional view, taken along the line 5—5 of Figure 4.

Figure 6 is a perspective view of one of the wire spring elements of the seating construction of Figure 1, shown as attached to the top and bottom rails of the frame thereof.

Referring now more particularly to the construction shown in the drawings, reference numeral 2 designates generally a wire spring seating construction embodying the present invention and comprising an open frame or supporting means 3 of L-shaped form mounting a plurality of wire spring elements 4 in transverse side-by-side relation. The frame 3 includes a spaced pair of generally parallel channel-shaped rails including a stationary, horizontally arranged lower rail 5 and a stationary, horizontally arranged upper rail 6 secured to the lower rail 5 by means of a pair of tubular side arms 7 of L-shaped form. The frame 3 provides a relatively fixed supporting means for suspending a plurality of wire spring elements 4 from the lower and upper rails 5 and 6 in substantially parallel and side-by-side relation crosswise of the frame. Each of the wire spring elements 4 embodies a zigzag-shaped, longitudinally extensible seat portion 8, and a straight wire, longitudinally non-extensible back rest portion 9 integrally extended from and cooperating with seat portion 8. The back rest portion 9 is forwardly curved and aligned with the longitudinal axis of seat portion 8.

Each longitudinally extensible wire seat portion 8 of the plurality of wire spring elements 4 is mounted on a web 10 of the channel-shaped lower rail 5 by means of a yieldable lever arm 11 extending rearwardly and downwardly from the front end 12 of the seat portion 8. The lever arm 11 is attached to the web 10 by a flat loop 14 projected upwardly from the web 10 (see Fig. 3), and by a hook-shaped portion 15 struck up from the web 10 to effect a substantially cantilever-like connection of the lever arm 11 with the web 10 (see also Figure 6).

The fixed connection of the lower and rearward end of the lever arm 11 to the rail 5, and the yieldability of the lever arm in response to seating loads enables an arcuate forward movement of the front end 12 of the wire seat portion 8 to various positions of balanced response to the normal or static seating load and to shock loads, whereby an effective fore and aft stability is achieved for the wire spring elements 4. The longitudinally non-extensible straight wire back rest portion 9 has its upper end portion 16 offset to permit its extension through one of a plurality of openings 17 in a web portion 18 of the channel-shaped upper rail 6. The upper end portion 16 includes an offset portion 19 adapted to be engaged with the front face of the web 18 for the purpose of extending the back rest portion 9 in cantilever-like fashion from upper rail 6 (see Figures 4 and 5).

The elongated seat portion 8 and the elongated back rest portion 9 of each wire spring element 4 are integrally connected with each other as a single unitary structure by a rearwardly and upwardly extended sweep 20 of substantial arcuate length at the rear end of the seat portion 8, merging or blending with the back rest portion 9. Bending or opening movements of wire spring element 4 at the zone of interconnection formed by sweep 20 is distributed over a substantial length of arc, thereby contributing to a movement of the seat spring construction toward effective hugging support of the body load in full conformity with the body load shape.

The wire spring element 4, with its rearwardly and upwardly curved sweep 20, wraps tightly against an occupant's body only when the wire spring element is exposed to shock loads and when the shock load "travel" or extent of yielding should be limited. This action is caused by the provision of a pronounced forwardly bowed portion 21 in the lower part of the forwardly curved straight wire back rest portion 9. Under normal load the curved sweep 20 effects a relatively gentle, yielding response to and in conformity with the load shape, and under shock load it effects an immediate and substantial "opening up" of the arc of curvature thereof to more closely conform with the increased load force being impressed by the shape of an occupant's body. This opening up and wrapping against the load shape by sweep 20, while momentarily increasing the hugging contact with an occupant's body is partly counteracted or limited by the longitudinal extension of the sweep 20 under load, and is so uniform and balanced as not to cause any objectionable or particularly noticeable force effects to be exerted against an occupant.

The wire spring elements 4 are connected to each other by a suitable U-shaped edge wire member 22 (see Figure 3), forming the border wire for the seat area of the construction, indicated generally at 23.

A wire spring seating construction of the type herein described is particularly characterized by the mounting of each of its plurality of generally L-shaped wire spring elements 4 on a generally L-shaped frame 3 by supporting the front portion of the seat portion 8 in overhanging, cantilever-like fashion upon the horizontal lower rail 5 and by suspending the non-extensible back rest portions 9 from the elevated horizontal upper rail 6 of the L-shaped frame 3 and restrain the rear ends of the seat portions against vertical shifting. Such a freely-hanging suspension, wherein the seat area 23 has a yielding front end to insure fore-and-aft and vertical stability of the entire assembly of wire spring elements 4, serves to achieve a cooperative load reaction of the collective suspended seat portions 8 and back rest portions 9 for huggingly supporting an occupant by counteractingly responding to substantial areas of the body load shape, including particularly the hollow part of occupant's back, while eliminating excessive localized stresses in the wire spring elements 4 under normal and shock loads.

While there has been shown a particular embodiment of the invention, it will be obvious to those skilled in the art that various changes and modifications may be made therein without departing from the invention, therefore, it is intended in the appended claims to cover all such changes and modifications as fall within the true spirit and scope of the invention.

What I claim as new and desire to secure by Letters Patent of the United States is:

1. In a seat spring construction, the combination of vertically spaced, laterally offset lower and upper supporting means and a unitary wire spring element of L-shaped form having a first arm formed of zigzag wire and a second arm formed of straight wire, said first arm forming a generally horizontal, longitudinally extensible seat portion and said second arm forming a generally vertical, longitudinally non-extensible back rest portion, said seat portion having its front end in substantially overhanging, elevated position in cantilever-like fashion mounted on the lower supporting means to yieldingly support the front end of the seat portion and said back rest portion having its upper end suspended from the upper supporting means so as to restrain the rear end of the seat portion against vertical shifting.

2. In a seat spring construction, the combination of vertically spaced, laterally offset lower and upper supporting means and an L-shaped unitary wire spring element having a first arm of zigzag wire forming a generally horizontal, longitudinally extensible seat portion upwardly curved at its rear end and a second arm of straight wire forming a generally vertical, longitudinally non-extensible back rest portion, said seat and back rest portions merging on a curved line, said seat portion having its front end in substantially overhanging, elevated position in cantilever-like fashion mounted on the lower supporting means to yieldingly support the front end of the seat portion and said back rest portion having its upper end suspended from the upper supporting means so as to restrain the rear end of the seat portion against vertical shifting.

3. A unitary L-shaped wire spring element for seat spring constructions comprising a zigzag wire seat portion and a straight wire back rest portion integrally extended from the rear end of said zigzag wire seat portion, said zigzag wire seat portion forming a generally horizontal, longitudinally extensible seat portion with an upwardly and rearwardly extended curved sweep at the rear end thereof, said straight wire portion forming a generally vertical back rest portion extending upwardly from said sweep, and attaching means at the free ends of said seat and back rest portions.

4. An L-shaped wire spring element for seat spring constructions comprising a zigzag wire portion and a straight wire portion integrally extended from said zigzag wire portion, said zigzag wire portion forming a generally horizontal, longitudinally extensible seat portion having a rearwardly and upwardly extended curved sweep at the rear end thereof, said straight wire portion forming a longitudinally non-extensible back rest portion extending upwardly from the curved sweep, said wire seat portion being upwardly curved and said wire back rest portion being forwardly curved, said curved sweep being extended rearwardly with respect to the forwardly curved back rest portion to rearwardly space the central portion of the curved sweep from a normal seated body loading upon said element, rearwardly and downwardly extended supporting means at the front end of the seat portion, and attaching means at the upper end of the back rest portion.

5. A wire spring element as described in claim 4, wherein the forwardly curved back rest portion includes in its lower part immediately above the curved sweep a forwardly bowed portion arranged to extend opposite the hollow portion of the seated body load shape at the small of an occupant's back.

References Cited in the file of this patent

FOREIGN PATENTS

| 635,466 | Great Britain | Apr. 12, 1950 |
| 645,113 | Great Britain | Oct. 25, 1950 |